United States Patent
Ariga et al.

(10) Patent No.: US 11,037,337 B2
(45) Date of Patent: Jun. 15, 2021

(54) METHOD AND APPARATUS FOR GENERATING MEASUREMENT PLAN FOR MEASURING X-RAY CT

(71) Applicant: MITUTOYO CORPORATION, Kanagawa (JP)

(72) Inventors: Kozo Ariga, Tokyo (JP); Gyokubu Cho, Kanagawa (JP); Hidemitsu Asano, Kanagawa (JP); Masato Kon, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 170 days.

(21) Appl. No.: 16/299,513

(22) Filed: Mar. 12, 2019

(65) Prior Publication Data
US 2019/0287274 A1   Sep. 19, 2019

(30) Foreign Application Priority Data

Mar. 19, 2018 (JP) .............................. JP2018-051551

(51) Int. Cl.
*A61B 6/00* (2006.01)
*G06T 11/00* (2006.01)
*G01N 23/046* (2018.01)

(52) U.S. Cl.
CPC .......... *G06T 11/005* (2013.01); *G01N 23/046* (2013.01); *G01N 2223/306* (2013.01)

(58) Field of Classification Search
CPC ............ G01T 11/005; G01N 2223/306; G01N 23/046; G01N 23/083; G01N 2223/20; A61B 7/032; A61B 6/035; A61B 6/469; A61B 6/4021; G06T 7/00; G06T 7/0002; G06T 7/00014; G06T 7/10; G06T 7/50; G06T 2207/10116
See application file for complete search history.

(56) References Cited

U.S. PATENT DOCUMENTS 6,574,304 B1 * 6/2003 Hsieh ..................... A61B 6/032
378/62
10,190,996 B2 1/2019 Matsumiya et al.

FOREIGN PATENT DOCUMENTS

JP      2016-205899 A      12/2016

OTHER PUBLICATIONS

U.S. Appl. No. 16/250,167 to Kozo Ariga et al., filed Jan. 17, 2019.
(Continued)

*Primary Examiner* — Don K Wong
(74) *Attorney, Agent, or Firm* — Greenblum & Bernstein, P.L.C.

(57) ABSTRACT

When generating a measurement plan for measuring X-ray CT that performs X-ray irradiation while rotating a test object, and in doing so acquires projection image data, reconstructs volume data from the projection image data, and measures a targeted measurement location in the volume data, the present invention calculates required measurement accuracy and a measurement field of view range based on tolerance information included in CAD data of the test object and a measurement location on the test object defined by a measurement operator ahead of time, and automatically generates, from this information, an optimized measurement plan that minimizes the number of measurements.

7 Claims, 12 Drawing Sheets

(56) References Cited

OTHER PUBLICATIONS

U.S. Appl. No. 16/291,699 to Hidemitsu Asano et al., filed Mar. 4, 2019.
U.S. Appl. No. 16/291,674 to Sadayuki Matsumiya et al., filed Mar. 4, 2019.
U.S. Appl. No. 16/250,201 to Hidemitsu Asano et al., filed Jan. 17, 2019.
Automatic Measurement Program Generation Software: MiCAT Planner, 16019 dated Jan. 2014.

* cited by examiner

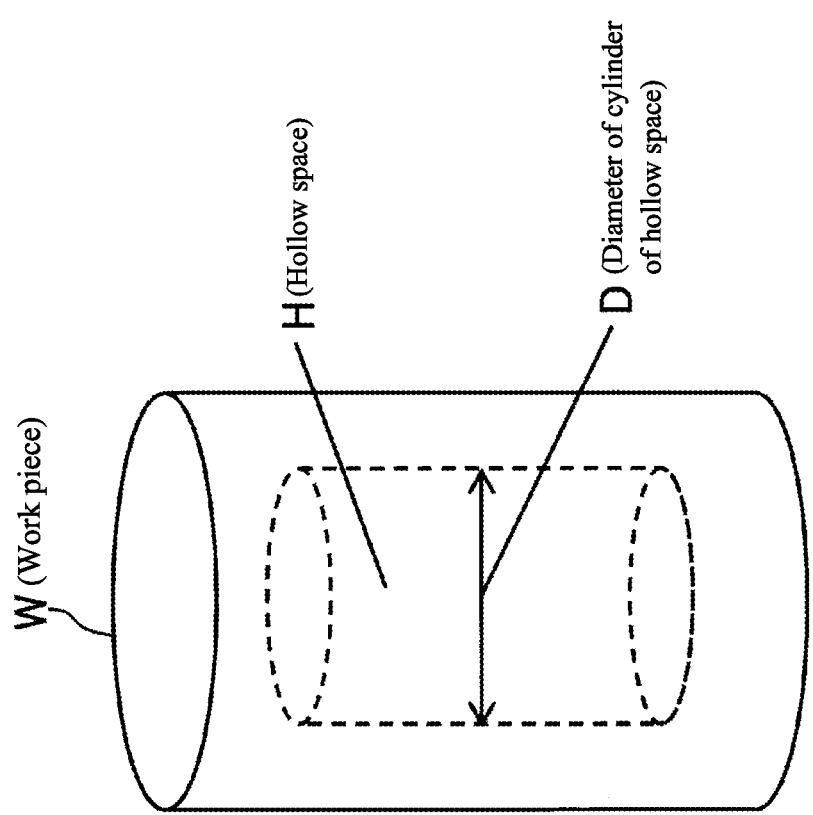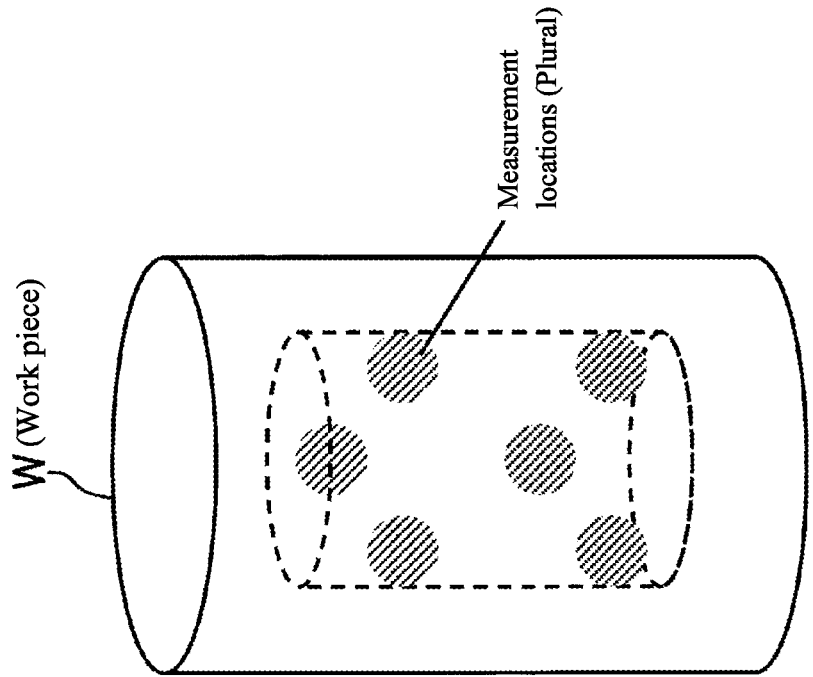

US 11,037,337 B2

METHOD AND APPARATUS FOR GENERATING MEASUREMENT PLAN FOR MEASURING X-RAY CT

CROSS-REFERENCE TO RELATED APPLICATIONS

The present application claims priority under 35 U.S.C. § 119 of Japanese Application No. 2018-051551, filed on Mar. 19, 2018, the disclosure of which is expressly incorporated by reference herein in its entirety.

BACKGROUND OF THE INVENTION

1. Field of the Invention

The present invention relates to a method and an apparatus for generating a measurement plan for measuring X-ray CT. In particular, the present invention relates to a method and an apparatus for generating a measurement plan for measuring X-ray CT that is capable of automatically calculating a measurement field of view magnification to ensure measurement accuracy, and that is capable of automatically generating an optimized measurement plan including a measurement field of view that fits as many targeted measurement locations as possible.

2. Description of Related Art

In a measuring X-ray CT apparatus that obtains volume data (or a tomographic image) of a test object non-destructively, as described in Japanese Patent Laid-open Publication No. 2016-205899 for example, an X-ray irradiation is performed while rotating the test object, and in doing so, projection image data is acquired and the volume data is reconstructed from the projection image data. A measurement operator measures targeted measurement locations in the volume data. The volume data is generated based on the measurement field of view. However, while the measurement locations can be measured accurately when the measurement field of view is smaller, not all targeted measurement locations fit in the measurement field of view and X-ray images may need to be captured a number of times.

A configuration of a generic measuring X-ray CT apparatus and a measurement procedure for a work piece are described below.

As shown in FIG. 1, a generic X-ray CT apparatus which is used for measurement is configured with an enclosure 10 which shields X-rays, a controller 30, and a control PC 40. The enclosure 10 includes therein: an X-ray tube 12 that fires X-rays 13, an X-ray detection device 14 detecting the X-rays 13, a rotary table 16 on which a test object (such as a work piece) W is placed and which rotates the test object W for CT imaging, and an XYZ displacement mechanism 18 adjusting a position or magnification of the test object W which is projected onto the X-ray detection device 14. The controller 30 controls the devices mentioned above, and the control PC 40 issues instructions from a user operation to the controller 30.

An X-ray CT control program 42 is running on the control PC 40 and the X-ray CT control program 42 controls each device, displays a projection image of the test object W which is projected onto the X-ray detection device 14, and generates a tomographic image as volume data from a plurality of projection images of the test object W.

In addition, it is known that, when the X-rays 13 pass through an object, a not-insignificant number of scattered X-rays that reflect in a different direction from an irradiation direction are generated and the scattered X-rays appear as noise in an X-ray CT imaging result. In order to suppress the scattered X-rays, an X-ray collimator 20 is provided near the X-ray tube 12. The X-ray collimator 20 is configured with upper and lower components made of an X-ray non-transmissible material (such as tungsten) in order to restrict an irradiation range of the X-rays 13 and those components can be shifted in an up-down direction respectively. The X-ray collimator 20 can be adjusted from the control PC 40 in accordance with an image capture range of the test object W.

As shown in FIG. 2 (perspective view when the test object is a cylinder) and in FIG. 3 (plan view when the test object is a rectangular column), the X-rays 13 fired from the X-ray tube 12 (X-ray source) pass through the test object W on the rotary table 16 and reach the X-ray detection device 14. The tomographic image of the test object W is generated by obtaining, with the X-ray detection device 14, transmission images of the test object W in various directions while rotating the test object W.

At this time, by controlling XYZ axes of the XYZ displacement mechanism 18 and a θ axis of the rotary table 16, the position of the test object W can be shifted and the image capture range (position, magnification) or an image capture angle of the test object W can be adjusted.

A measurement using such a measuring X-ray CT apparatus is generally performed by the following two procedures.

(i) Generating volume data by a CT scan
(ii) Measurement of volume data

Specific measurement procedures are described below.

(i) Generating Volume Data by a CT Scan

For example, measurement of the work piece (test object) W depicted in FIG. 4A is considered. The work piece W has a cylindrical outer shape and has a cylindrical hollow space H on an interior thereof, and a diameter D of the cylinder of the hollow space H is measured. For the measurement procedure, a surface of the hollow space (boundary between the material and air) is detected first and a plurality of measurement points (detection points) are obtained. On the basis of a set of these measurement points, a best fit hollow cylinder is created for the cylindrical shape of the hollow space, and then the diameter D is calculated.

For the measurement locations to obtain the set of measurement points, it is better to select a measurement location having no deviation in consideration of the cylindrical hollow space, and therefore three measurement locations in a circumferential direction for the respective upper and lower portions of the cylinder (total of six locations) are selected as shown in FIG. 4B. The plurality of measurement points can be obtained in one measurement location.

Here, the measurement magnification for each measurement location must be determined, and tolerance information is used for deriving the measurement magnification.

When a tolerance in the cylindrical diameter D which is ultimately calculated is ±0.1 mm, the measurement points used in the calculation of the cylindrical diameter D must be found with a higher degree of accuracy than 0.1 mm (0.01 mm for example). In addition, these measurements are performed on the volume data, and therefore the volume data must have the accuracy required for the measurement. In this example, the accuracy of the volume data is expressed by a voxel size [mm], and generating volume data having a voxel size of 0.01 mm is considered.

When a distance from the X-ray source 12 to a center of the rotary table 16 is defined as fcd (Focus to Center Distance) and a distance from the X-ray source 12 to the X-ray detection device 14 is defined as fdd (Focus to Detector Distance), mag (the magnification) is expressed below.

[Formula 1]
$$mag = \frac{fdd}{fcd} \quad (1)$$

When a horizontal width of the X-ray detection device 14 is defined as DetectorWidth [mm], a width of the generated volume data is defined as VolumeWidth [pixels], and the voxel size is defined as VoxelSize [mm/pixel], a relational expression is expressed below.

[Formula 2]
$$VoxelSize \times VolumeWidth = \frac{DetectorWidth}{mag} \quad (2)$$

Solving the formula noted above for mag gives the following result.

[Formula 3]
$$mag = \frac{DetectorWidth}{VoxelSize \times VolumeWidth} \quad (3)$$

When generating the volume data having the voxel size of 0.01 mm as described above, for a distance fdd from the X-ray source 12 to the X-ray detection device 14 that is defined as 1000 mm, a horizontal width DetectorWidth of the X-ray detection device 14 that is defined as 400 mm, and a width VolumeWidth of the volume data that is defined as 2000 pixels, the required magnification is 20 times. The desired volume data can be generated by changing the position or angle of the rotary table 16, making adjustment so that the measurement location of the work piece W is displayed at 20 times magnification, and performing a CT scan.

When there are a plurality of the measurement locations, the magnification required for each measurement location is calculated respectively and is brought in line with the largest magnification (highest resolution).

(ii) Measurement of Volume Data

As described in the procedure above, the surface of the hollow space (boundary between the material and air) is detected first and the plurality of measurement points (detection points) are obtained. On the basis of the set of measurement points, a best fit hollow cylinder is created for the cylindrical shape of the hollow space, and then the diameter D is calculated.

However, in the method described above, the measurement operator needs to perform the CT scan after considering the measurement location and measurement accuracy ahead of time, and there are challenges in creating a plan that results in the minimum number of CT scans for the plurality of measurement locations.

A product catalog of MiCAT Planner <http://www.mitutoyo.co.jp/products/zahyou/auto.html>, which is software for a coordinate measuring device product group, describes a measurement plan being automatically generated from CAD data having tolerance information, but in its current form this technology cannot be used with a measuring X-ray CT apparatus.

SUMMARY OF THE INVENTION

The present invention has been conceived in order to resolve the conventional circumstances described above, and is configured for a measuring X-ray CT apparatus to automatically calculate a measurement field of view magnification that can ensure proper measurement accuracy from information such as a tolerance included in CAD data of a test object, and to automatically generate an optimized measurement plan including a measurement field of view that fits as many targeted measurement locations as possible.

The present invention addresses the challenges noted above by way of a method for generating a measurement plan for measuring X-ray CT that performs X-ray irradiation while rotating a test object, and in doing so acquires projection image data, reconstructs volume data from the projection image data, and measures a targeted measurement location in the volume data. The method calculates required measurement accuracy and a measurement field of view range based on tolerance information included in CAD data of the test object and a measurement location on the test object defined by a measurement operator ahead of time; and automatically generates, from this information, an optimized measurement plan that minimizes the number of measurements.

In this example, the auto-generation of the measurement plan can be performed by using an arbitrary measurement location as a standard; verifying whether other arbitrary measurement locations can each be measured using the same measurement magnification as the standard; forming groups that can be measured at the same measurement magnification; determining a CT scan position for generating volume data for each group; and assigning the positions an order.

The present invention similarly addresses the challenges noted above by way of an apparatus for generating a measurement plan for measuring X-ray CT that performs X-ray irradiation while rotating a test object, and in doing so acquires projection image data, reconstructs volume data from the projection image data, and measures a targeted measurement location in the volume data. The apparatus is provided with a measurement plan auto-generation program which calculates required measurement accuracy and a measurement field of view range based on tolerance information included in CAD data of the test object and a measurement location on the test object defined by a measurement operator ahead of time, and automatically generates, from this information, an optimized measurement plan that minimizes the number of measurements.

In this example, the measurement plan auto-generation program can generate the measurement plan by using an arbitrary measurement location as a standard; verifying whether other arbitrary measurement locations can each be measured using the same measurement magnification as the standard; forming groups that can be measured at the same measurement magnification; determining a CT scan position for generating volume data for each group; and assigning the positions an order.

In the measuring X-ray CT, a task of adjusting a measurement field of view that is difficult to adjust can be performed automatically using CAD data, and a measurement plan that records the adjustment result can be generated automatically. Accordingly, the magnification calculation required for each measurement location and the optimized measurement plan for the measurement location, which conventionally were handled by the measurement operator, can be generated automatically and the work of the measurement operator can be made more efficient.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 4A and 4B are perspective views illustrating examples of the test object and measurement locations;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present invention is described in detail with reference to the drawings. Moreover, the present invention is not limited by the content described in the embodiment and examples that follow. Configuration requirements in the following embodiment and examples may also include that which is readily conceivable by one skilled in the art, that which is substantially similar, and that which encompasses an equivalent scope. Furthermore, the configuration requirements disclosed in the following embodiments and examples may be combined as appropriate, or may be selectively employed as appropriate.

Figure 5:
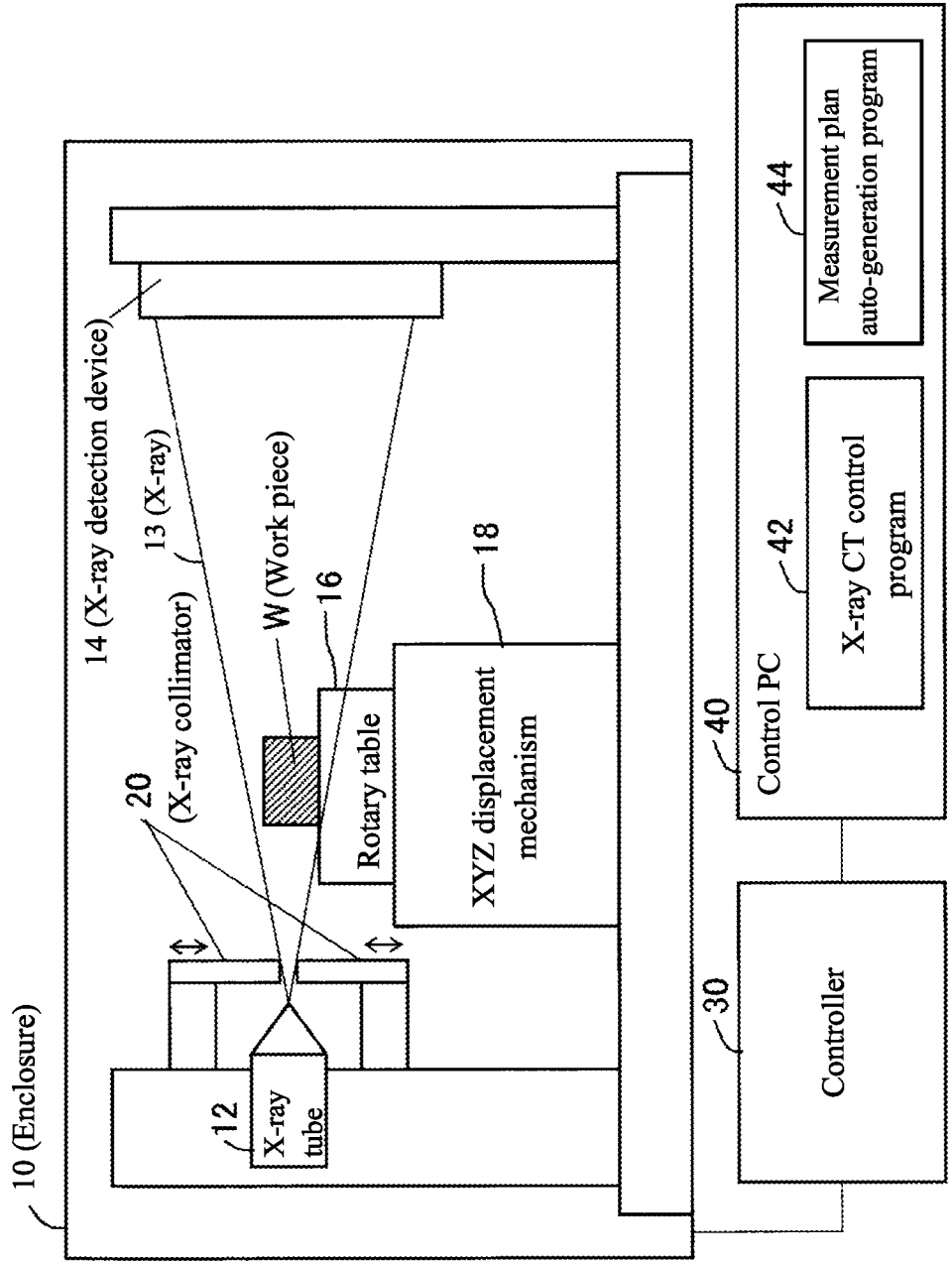
FIG. 5 is a front view illustrating an overall configuration of a measuring X-ray CT apparatus according to the present invention.

FIG. 5 illustrates an embodiment of a measuring X-ray CT apparatus according to the present invention.

Figure 1:
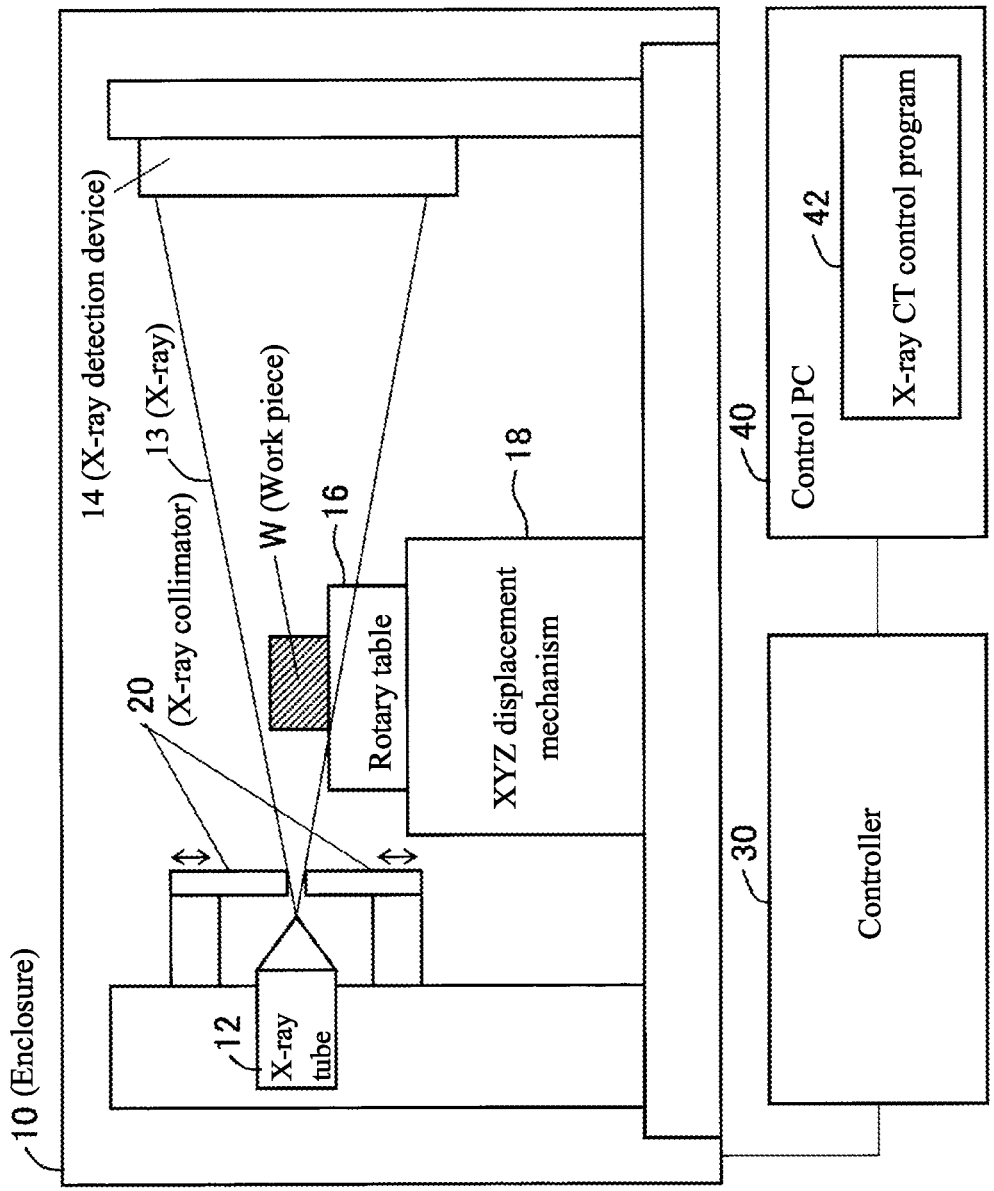
FIG. 1 is a front view illustrating an overall configuration of a generic measuring X-ray CT apparatus.
Figure 2:
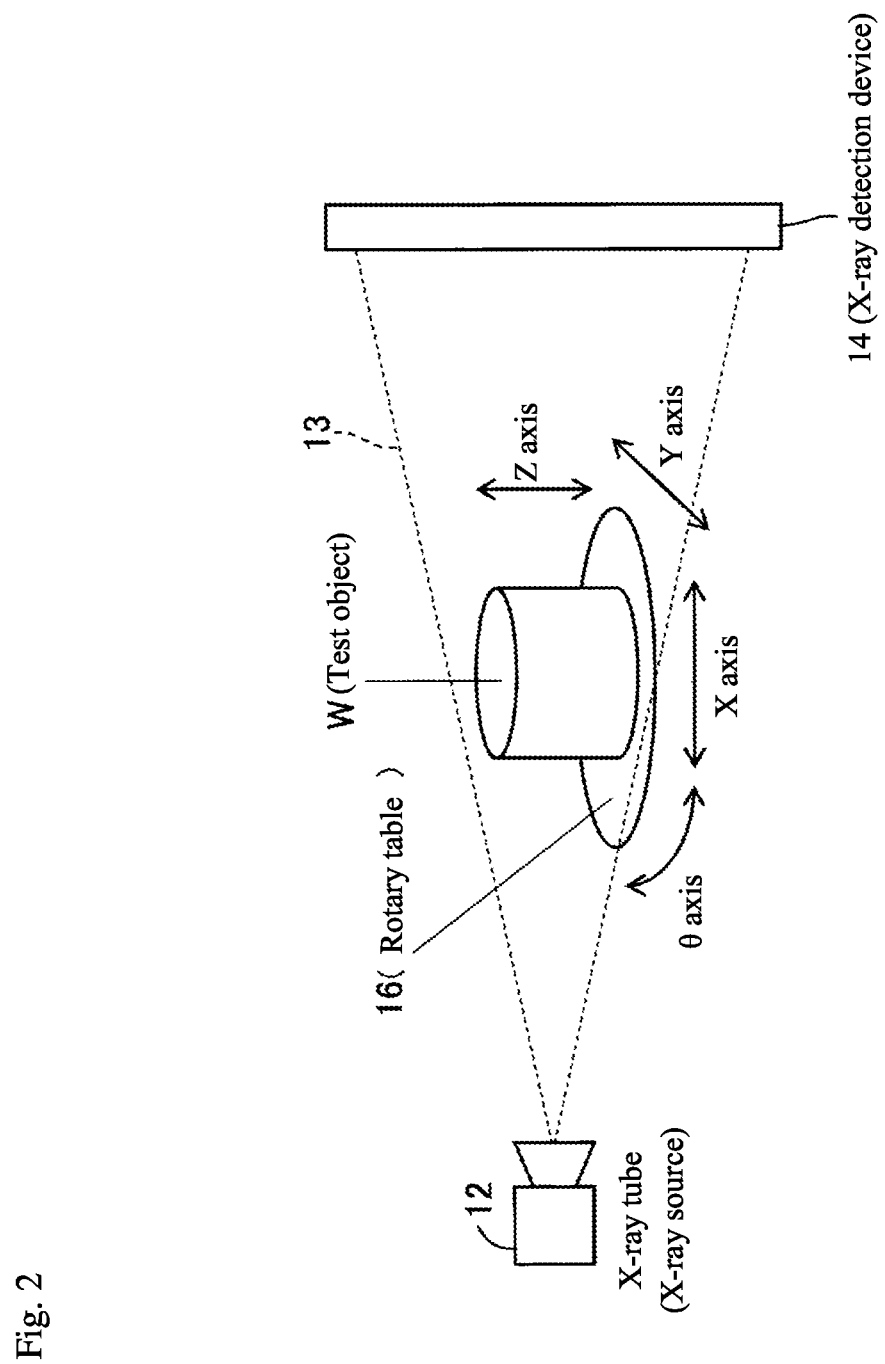
FIG. 2 is a perspective view showing a configuration of a relevant portion of the generic measuring X-ray CT apparatus when a test object is a cylinder.
Figure 3:
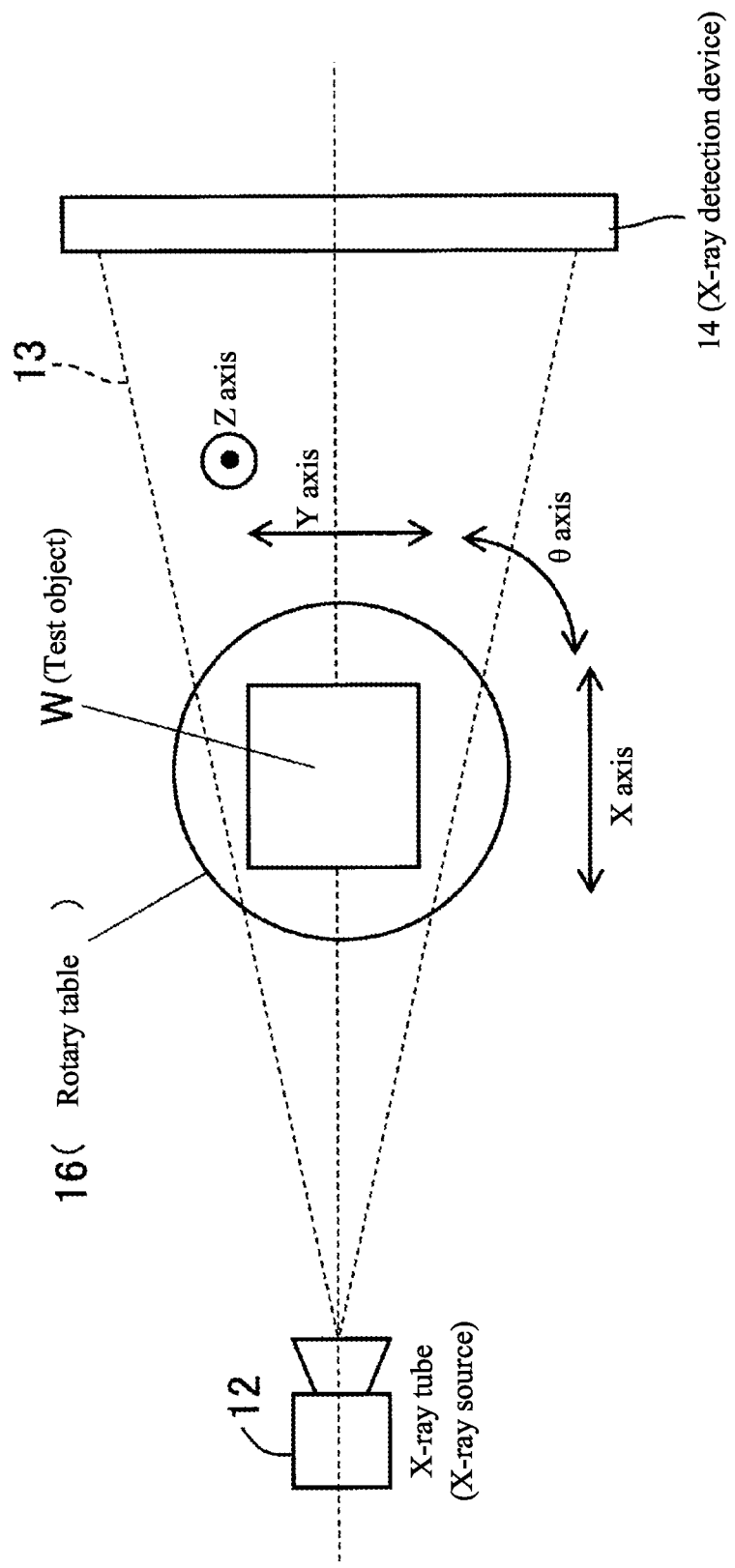
FIG. 3 is a plan view showing a configuration of a relevant portion of the generic measuring X-ray CT apparatus when the test object is a rectangular column.

In the embodiment, a measurement plan auto-generation program 44 is newly added to an apparatus configuration similar to FIG. 1. The measurement plan auto-generation program 44 performs auto-generation of a measurement plan (main component of the present invention).

The measurement plan generated by the measurement plan auto-generation program 44 includes CT scan positions (plural) of a work piece W, measurement locations (plural) of volume data that is generated by the CT scans, and information for a measurement order of the positions and locations.

Figure 6:
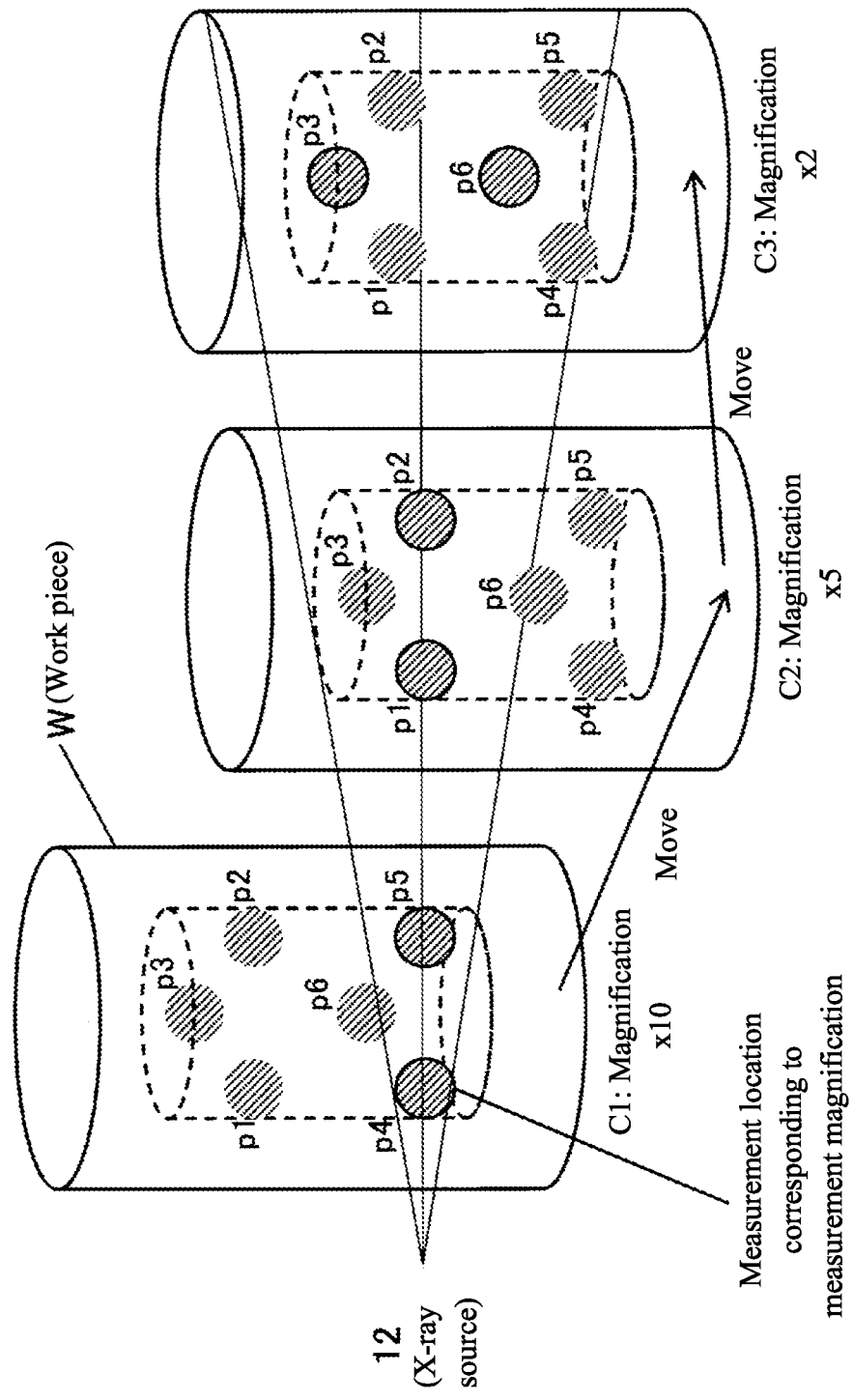
FIG. 6 is a perspective view of an exemplary measurement plan.

The measurement plan as shown in FIG. 6 is generated for the work piece W illustrated in FIGS. 4A and 4B, for example.

C1, C2, and C3 show the CT scan positions respectively and measurement magnification is uniquely determined by the CT scan position. Further, the plan shows that the CT scans are performed in the order of C1⇒C2⇒C3, and shows locations to be measured with respect to the volume data generated by each CT scan.

Figure 7:
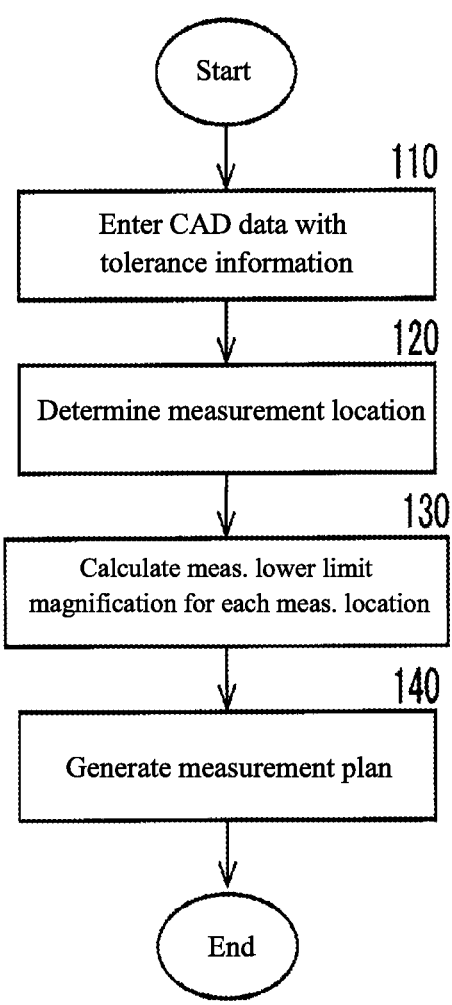
FIG. 7 is a flowchart illustrating a procedural flow according to an embodiment of the present invention.

Hereafter, a specific embodiment of the present invention is described below with reference to FIG. 7.

First in step 110, a measurement operator enters CAD data with tolerance information into the measurement plan auto-generation program 44. When an X-ray CT control program 42 is capable of performing other processes using the CAD data, the CAD data may be entered into the measurement plan auto-generation program 44 from the X-ray CT control program 42.

Next in step 120, measurement locations are determined using the tolerance information of the CAD data.

Then in step 130, using the tolerance information for each measurement location, a minimum magnification required for performing measurement (measurement lower limit magnification) is calculated. First, a required voxel size is found from the tolerance information and the required magnification is calculated from the voxel size.

When a tolerance accuracy is defined as precision, an adjustment parameter k (less than 1.0) is used and VoxelSize [mm/pixel] is calculated as shown below.

[Formula 4]

$$\text{VoxelSize} = k \times \text{precision} \qquad (4)$$

When a width of an X-ray detection device 14 is defined as DetectorWidth [mm] and a width of the volume data is defined as VolumeWidth [pixels], the measurement lower limit magnification (mag) is calculated as shown below.

[Formula 5]

$$mag = \frac{DetectorWidth}{VoxelSize \times VolumeWidth} \qquad (5)$$

Figure 8:
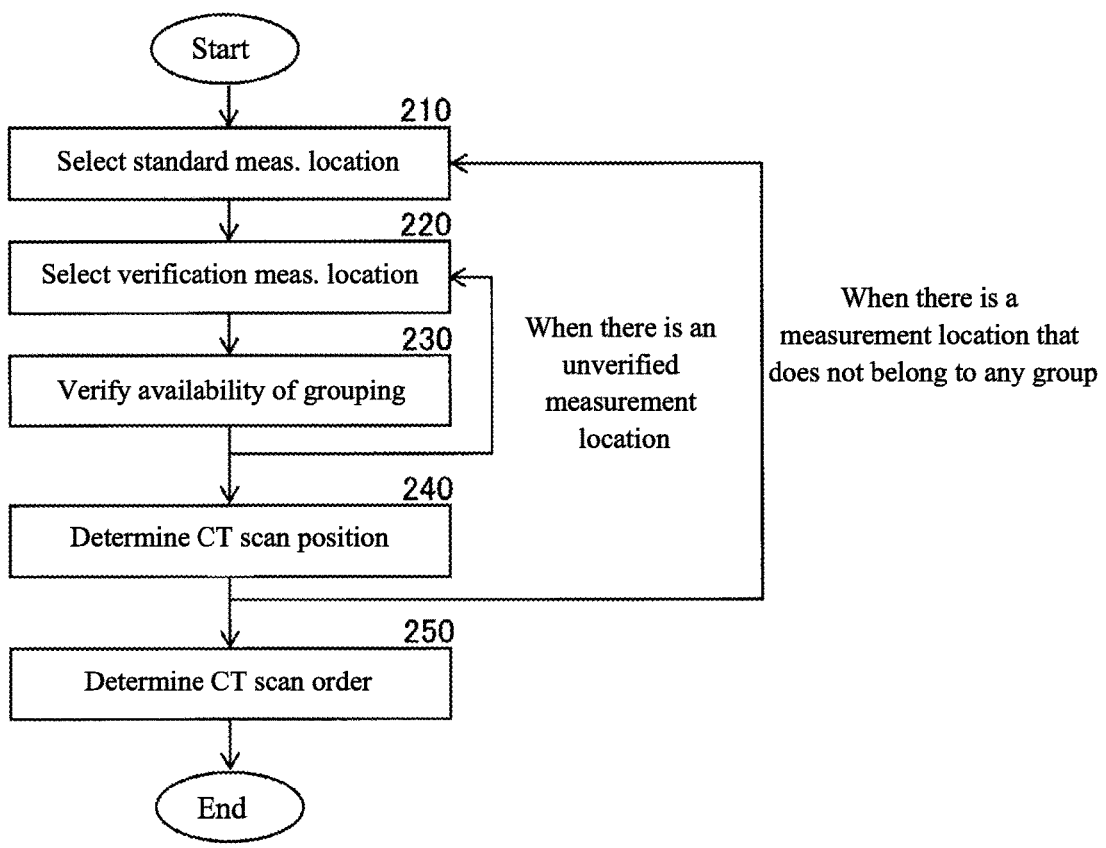
FIG. 8 is a flowchart illustrating a flow for generating the measurement plan according to the embodiment of the present invention.

Next in step 140, the measurement plan is generated as shown in FIG. 8.

As a method for generating the measurement plan, the method uses an arbitrary measurement location as a standard; verifies whether other arbitrary measurement locations can each be measured using the same volume data (that is, the same measurement magnification) as the standard; and forms groups that can be measured using the same volume data. When the measurement locations can be separates into groups, the CT scan positions for generating the volume data for each group are determined and an order is assigned thereto.

Hereafter, a specific implementation procedure is described with reference to FIG. 8.

When selecting the standard measurement location in step 210, a measurement location that will serve as the standard (standard measurement location) is selected from among the measurement locations that do not belong to any group. Since there are no groups at the initial stage of generating the measurement plan, the measurement location is selected from all measurement locations.

As a selection method, a target measurement location positioned on an end is selected. For example, the measurement location closest to an X-ray source 12 is defined as the standard reference.

Figure 9:
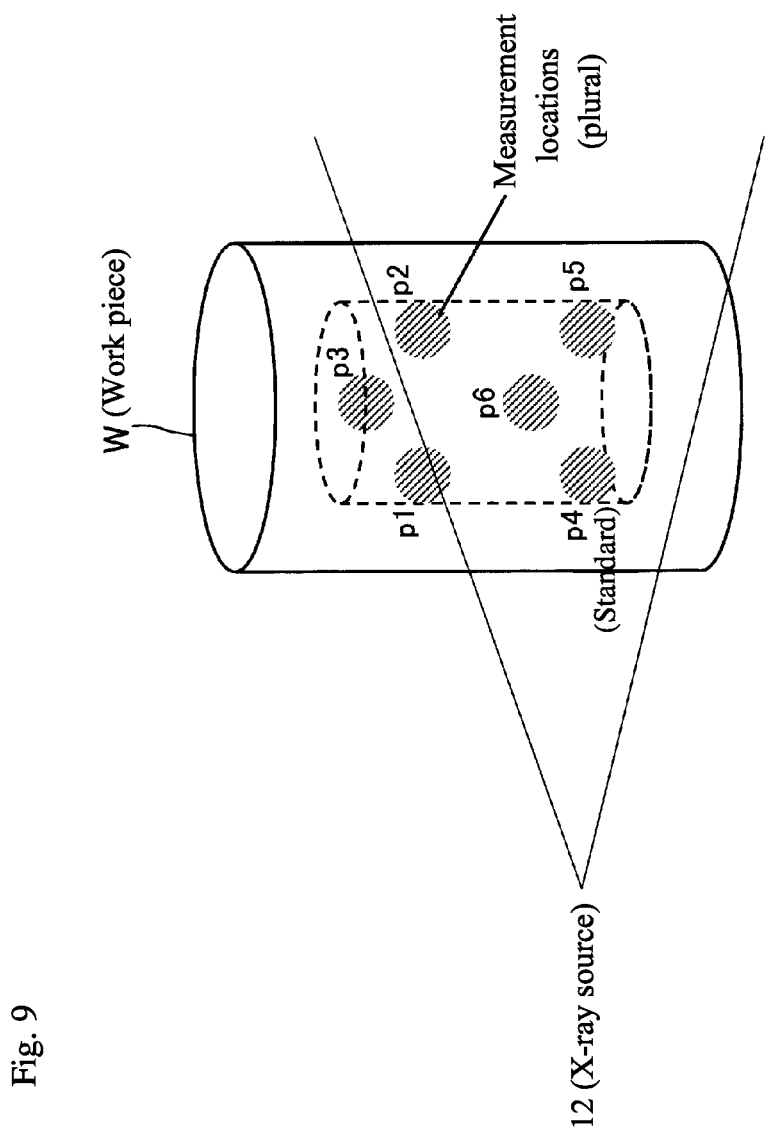
FIG. 9 is a perspective view illustrating an example of a standard measurement location.

In the example shown in FIG. 9, p4 is closest to the X-ray source 12 and is selected as the standard measurement location.

After selecting the standard measurement location, the following information is defined for the group that includes the standard measurement location:

Group identifier: Gn *n is a number
Group measurement magnification: Gn_Mag
Group reconstruction range: Gn_Range
Group measurement location list: Gn_MeasList Being in the same group means that the measurement locations can be measured using the same volume data, and the number of groups ultimately formed is equal to the number of volume data required for the measurement (in other words, the number of CT scan positions).

The group measurement magnification is a magnification of the work piece included in the corresponding volume data and an initial value thereof is set to the measurement lower limit magnification of the standard measurement location.

The group reconstruction range shows a range in real space of the corresponding volume data. In general, the reconstruction range is handled as a rectangular parallelepiped or a cylinder, however, for ease of calculation, only the cylinder is used in this example. In the case of the cylinder, a cylinder diameter and a cylinder height are used as values indicating the reconstruction range. The initial value is the reconstruction range uniquely obtained by the group measurement magnification. When a width of the X-ray detection device 14 is defined as DetectorWidth [mm], a width of the volume data is defined as VolumeWidth [pixels], and a height of the volume data is defined as VolumeHeight [pixels], the cylinder diameter (Diameter) and the cylinder height (Height) indicating the reconstruction range can be calculated as shown below.

[Formula 6]

$$VoxelSize = \frac{DetectorWidth}{Gn\_Mag \times VolumeHeight} \quad (6)$$

$$Diameter = VoxelSize \times VolumeWidth \quad (7)$$

$$Height = VoxelSize \times VolumeHeight \quad (8)$$

When selecting a verification measurement location in step 220, an arbitrary measurement location other than the standard measurement location is selected from among the measurement locations that do not belong to any group and is defined as the verification measurement location.

For verifying whether grouping is possible in step 230, verification is performed as to whether the verification measurement location can be measured with the same volume data as the standard measurement location. Specifically, verification is performed as to whether the measurement magnification can be matched and included in the same reconstruction range.

When considering a case where the verification measurement location is included in the group, the group measurement magnification can be matched to the larger of the current value and the measurement lower limit magnification of the verification measurement location. In addition, when the group measurement magnification is changed at this time, the group reconstruction range also changes. When the verification measurement location can be included in the new group reconstruction range, grouping is possible.

Figure 10:
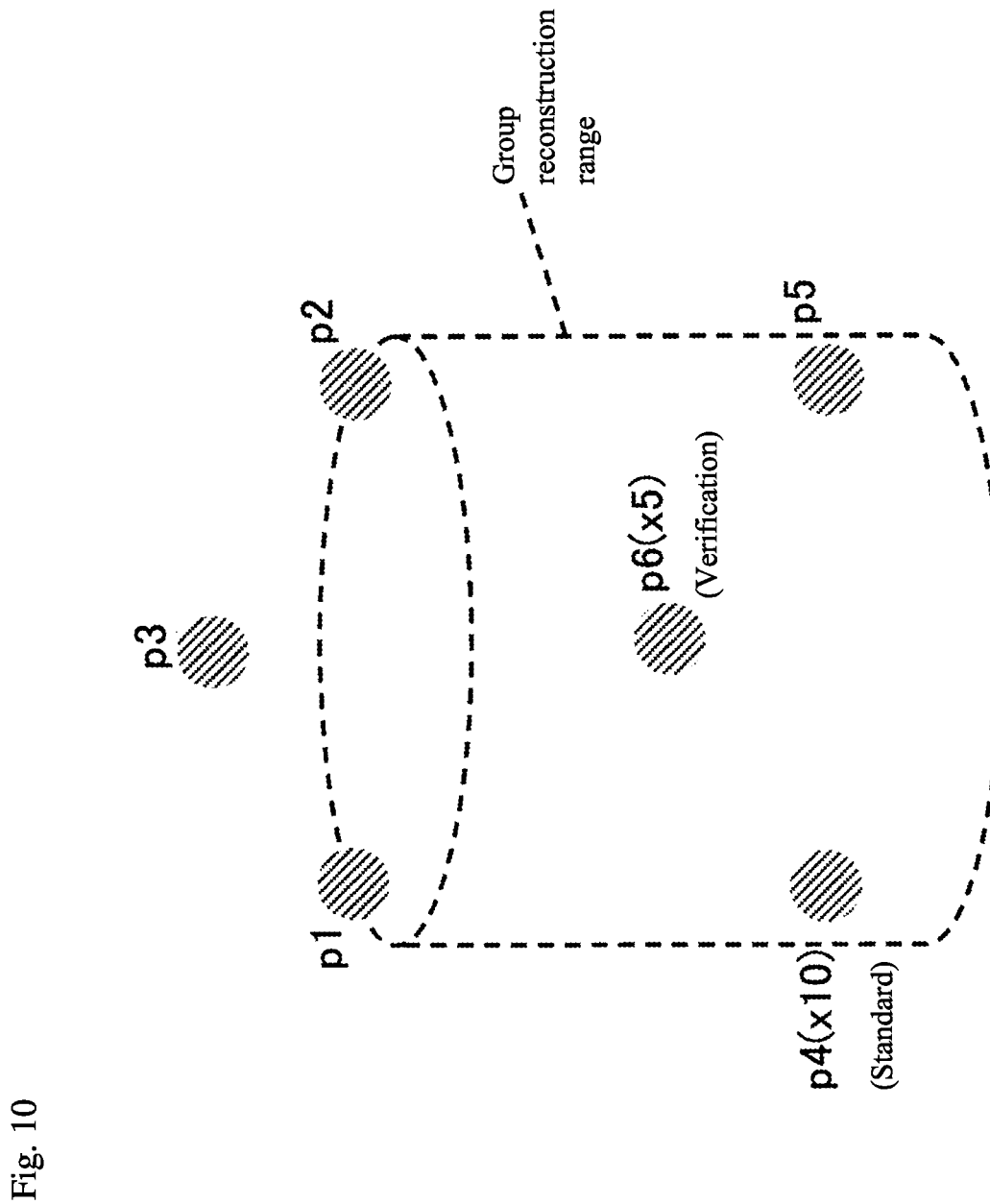
FIG. 10 is a perspective view illustrating an exemplary group reconstruction range.

For example, FIG. 10 indicates that, when the standard measurement location is defined as p4 and the verification measurement location is defined as p6, and the measurement lower limit magnification of p4 is ×10 and the measurement lower limit magnification of p6 is ×5, p6 is included in the reconstruction range (grouping is possible).

Figure 11:
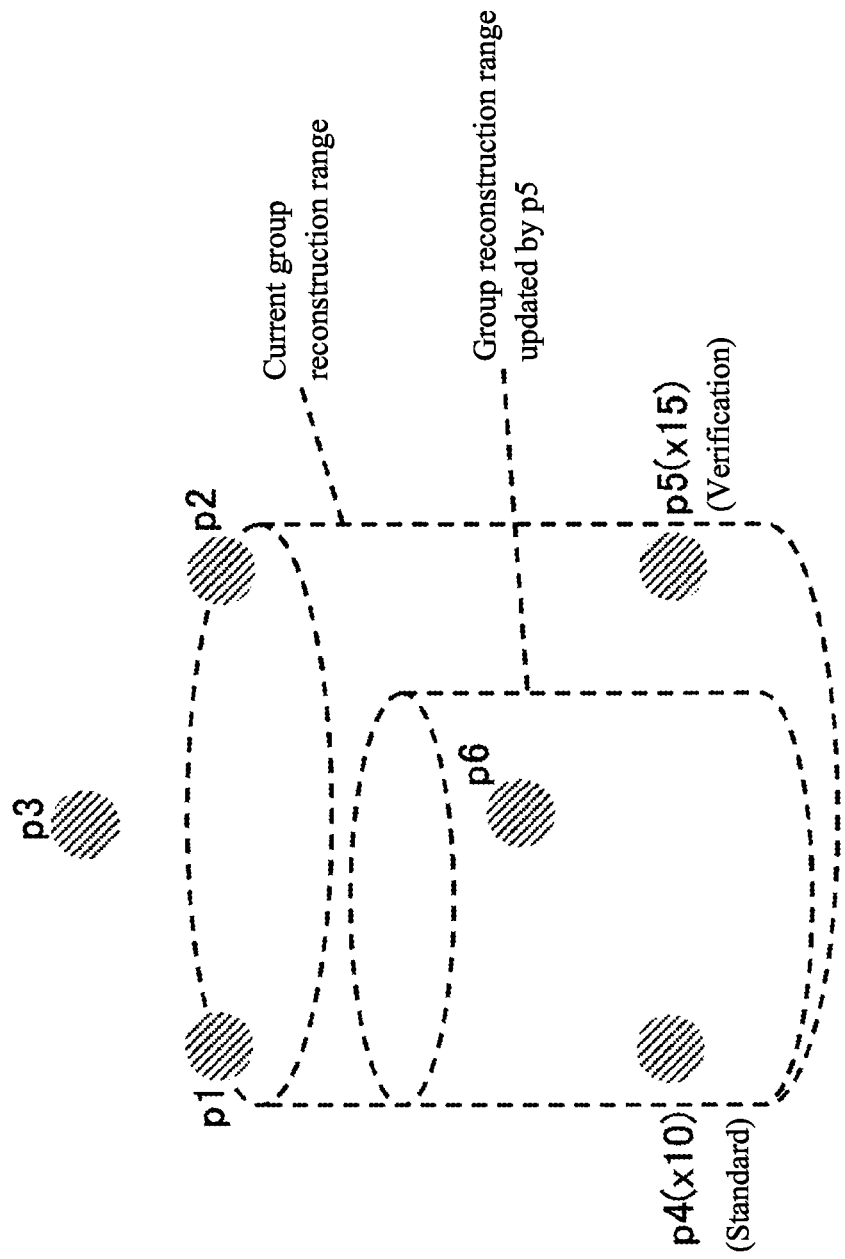
FIG. 11 is a perspective view illustrating another example of the group reconstruction range.

On the other hand, FIG. 11 indicates that, when the standard measurement location is defined as p4 and the verification measurement location is defined as p5, and the measurement lower limit magnification of p4 is ×10 and the measurement lower limit magnification of p5 is ×15, p5 is not included in the reconstruction range (grouping is not possible). When p5 is included, the group measurement magnification is increased to ×15, and the group reconstruction range becomes smaller accordingly.

In the embodiment noted above, verification is performed on the presumption that the position of the reconstruction range can be defined as desired, however, due to various restrictions depending on the apparatus configuration, such restrictions must be considered. For example, a center of the reconstruction range (cylinder axis) is matched with a rotation center (rotation axis). Therefore, unless there is a special mechanism or the like to change the rotation center, a relative relationship between the rotation axis and each measurement location of the work piece W placed directly on a rotary table 16 is fixed. Alternatively, the position of the reconstruction range is restricted due to upper and lower limits on displacement of the rotary table 16.

Figure 12:
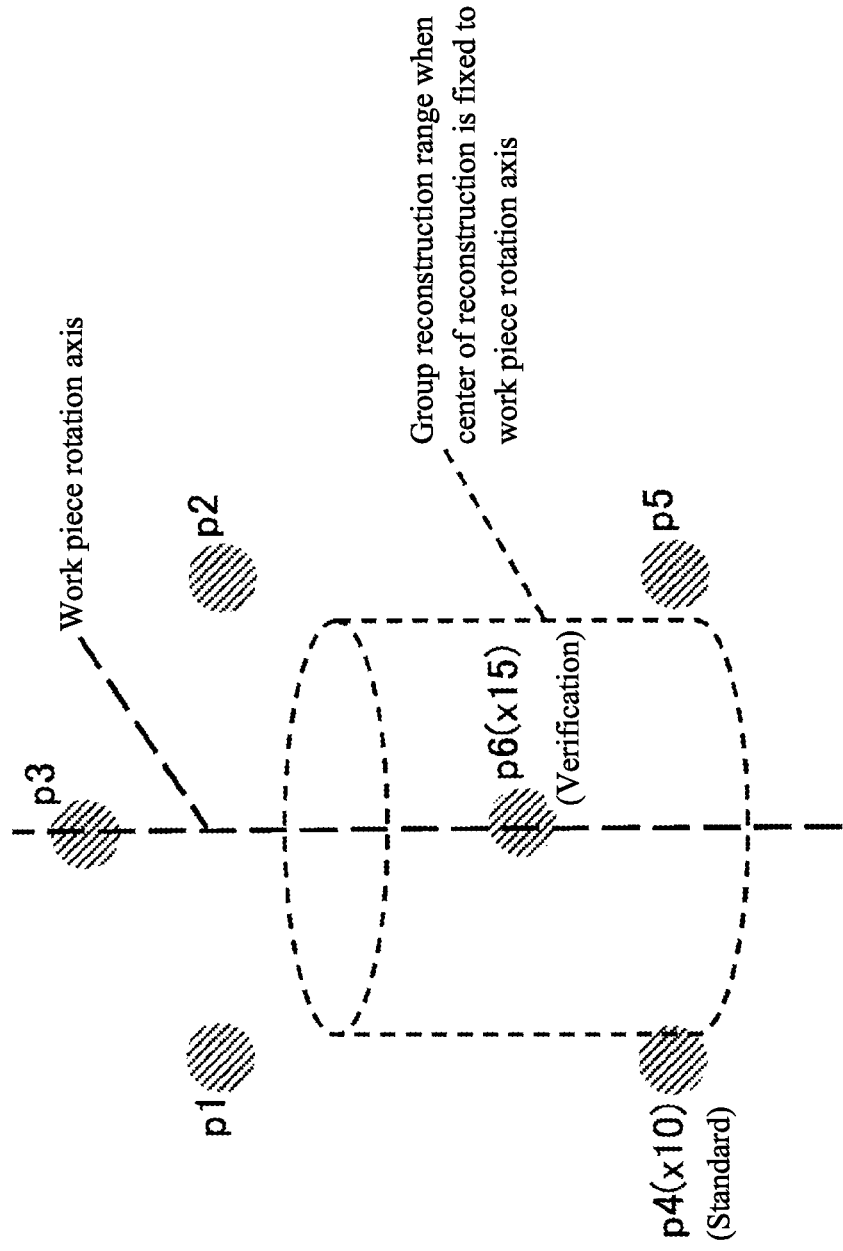
FIG. 12 is a perspective view illustrating yet another example of the group reconstruction range.

FIG. 12 illustrates a view where the center of the reconstruction range is fixed at the rotation axis of the work piece W when the measurement lower limit magnification of p6 is ×15.

When determining the CT scan positions in step 240, after repeating the processes in steps 220 and 230 until there are no further candidates for the verification measurement location, the group measurement magnification or the list of the group measurement locations is finalized and the CT scan positions are determined.

When a direction running between the X-ray source and the X-ray detection device is defined as an X axis, an X position of the rotary table 16 during the CT scan can be determined by the measurement magnification. When all measurement locations included in the group are included in the reconstruction range, Y/Z positions can be defined as desired within a range where the rotary table 16 can be displaced.

For example, a center of gravity of all measurement locations included in the group may be set so as to be positioned on the center of the reconstruction range.

When determining the CT scan order in step 250, the processes of step 210 to step 240 are repeated until all the measurement locations are included in any of the groups, after which an execution order is determined for the CT scan positions obtained from each group.

From the viewpoint of avoiding unnecessary displacement, the order should be set so as to achieve the shortest route for displacing the rotary table 16 to each CT scan position. From the viewpoint of overall measurement time, the displacement time of the rotary table 16 is much shorter than the CT scan execution time, and therefore, the displacement time is considered to have no effect on the overall measurement time.

In the above, an example of measurement of a hollow space in a cylindrical body is described, however an external shape or an internal shape of the test object are not limited to this.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A method for measuring a test object using X-ray computed tomography, the method comprising:
   receiving CAD data of the test object which includes tolerance information, the tolerance information being defined by a measurement operator ahead of time;
   determining a measurement location on the test object using the tolerance information;
   calculating a required measurement accuracy and a measurement field of view range based on the tolerance information and the measurement location;
   automatically generating, from the tolerance information, an optimized measurement plan that minimizes the number of measurements;
   performing X-ray irradiation while rotating the test object;
   acquiring projection image data;
   reconstructing volume data from the projection image data; and
   measuring a targeted measurement location in the volume data.

2. The method according to claim 1, wherein the automatically generating the measurement plan comprises:
   using an arbitrary measurement location as a standard;
   verifying whether other arbitrary measurement locations can each be measured using the same measurement magnification as the standard;
   forming groups that can be measured at the same measurement magnification;
   determining a CT scan position for generating volume data for each group; and assigning the positions an order.

3. An apparatus for measuring a test object using X-ray computed tomography, the apparatus comprising:
   a measurement plan auto-generation program stored on at least one tangible, non-transitory computer-readable medium, wherein the program, when executed by a computer processor, causes the computer processor to execute operations comprising:
   receiving CAD data of the test object which includes tolerance information, the tolerance information being defined by a measurement operator ahead of time;
   determining a measurement location on the test object using the tolerance information;
   calculating a required measurement accuracy and a measurement field of view range based on the tolerance information and the measurement location;
   automatically generating, from the tolerance information, an optimized measurement plan that minimizes the number of measurements;
   performing X-ray irradiation while rotating the test object;
   acquiring projection image data;
   reconstructing volume data from the projection image data; and
   measuring a targeted measurement location in the volume data.

4. The apparatus according to claim 3, wherein the automatically generating the measurement plan comprises:
   using an arbitrary measurement location as a standard;
   verifying whether other arbitrary measurement locations can each be measured using the same measurement magnification as the standard;
   forming groups that can be measured at the same measurement magnification;
   determining a CT scan position for generating volume data for each group; and
   assigning the positions an order.

5. At least one tangible, non-transitory computer-readable medium storing an executable set of instructions for operating a measurement plan auto-generation program, wherein the set of instructions, when executed by a computer processor, causes the computer processor to execute operations comprising:
   receiving CAD data of the test object which includes tolerance information, the tolerance information being defined by a measurement operator ahead of time;
   determining a measurement location on the test object using the tolerance information;
   calculating a required measurement accuracy and a measurement field of view range based on the tolerance information and the measurement location;
   automatically generating, from the tolerance information, an optimized measurement plan that minimizes the number of measurements;
   performing X-ray irradiation while rotating the test object;
   acquiring projection image data;
   reconstructing volume data from the projection image data; and
   measuring a targeted measurement location in the volume data.

6. The program according to claim 5, wherein the automatically generating the measurement plan comprises:
   using an arbitrary measurement location as a standard;

verifying whether other arbitrary measurement locations can each be measured using the same measurement magnification as the standard;

forming groups that can be measured at the same measurement magnification;

determining a CT scan position for generating volume data for each group; and assigning the positions an order.

7. The method according to claim 1, the method further comprising calculating a minimum magnification required for performing measurement from a required voxel size, the required voxel size being from the tolerance information.

* * * * *